UNITED STATES PATENT OFFICE.

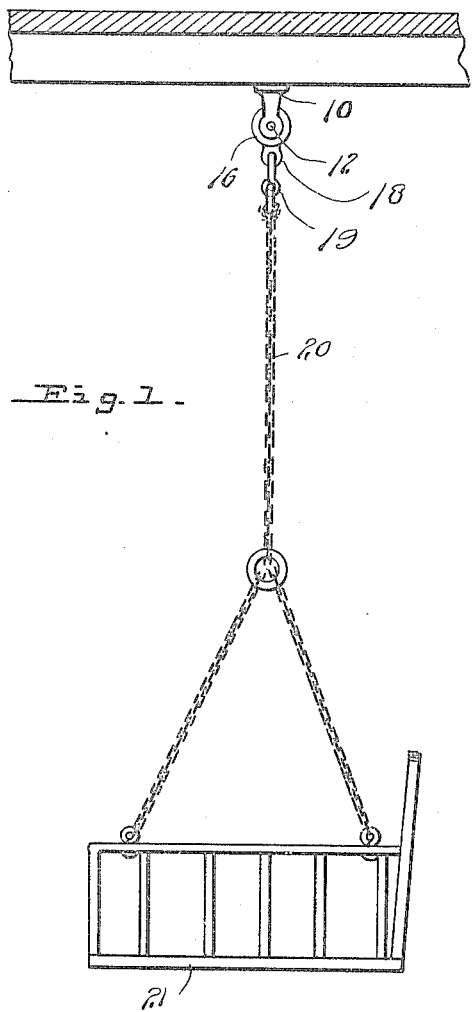
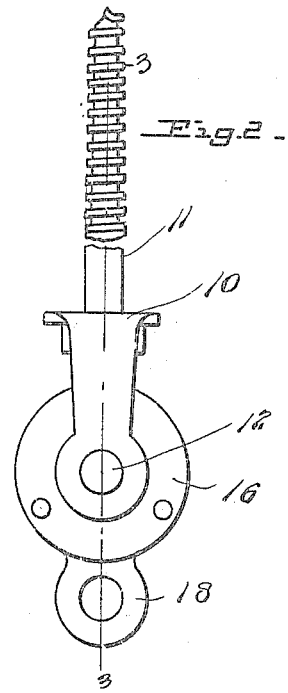
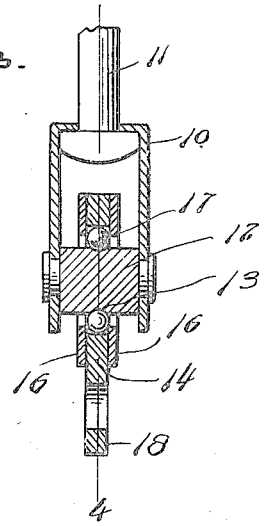
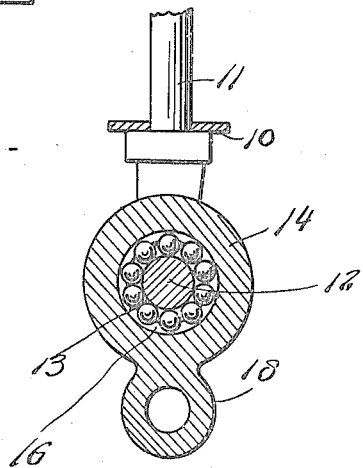

CHARLES I. NULL AND HERMAN P. RAAB, OF INDIANAPOLIS, INDIANA.

ANTIFRICTION-HANGER.

1,207,985.

Specification of Letters Patent.  Patented Dec. 12, 1916.

Application filed August 17, 1914. Serial No. 857,217.

*To all whom it may concern:*

Be it known that we, CHARLES I. NULL and HERMAN P. RAAB, citizens of the United States, residing at Indianapolis, in the county of Marion, State of Indiana, have invented certain new and useful Improvements in Antifriction-Hangers; and we do hereby declare the following to be a full, clear, and exact description of the invention, such as will enable others skilled in the art to which it appertains to make and use the same.

This invention relates to improvements in hanging and supporting devices, and particularly to a device for supporting a porch or lawn swing.

The principal object of the invention is to provide a simple and comparatively cheap device of this character which is noiseless in its operation.

Other objects and advantages will be apparent from the following description, when taken in connection with the accompanying drawings.

In the drawings: Figure 1 is a view showing our invention in applied position. Fig. 2 is an enlarged side elevation of one of the hangers. Fig. 3 is a vertical transverse sectional view on the line 3—3 of Fig. 2. Fig. 4 is a vertical section on the line 4—4 of Fig. 3.

Referring particularly to the accompanying drawings, 10 represents a yoke in the upper crossed member of which is disposed a screw 11 adapted to be driven into the joist of a porch ceiling or into the limb of a tree. In the lower ends of the arms of the yoke are formed openings which receive the ends of a shaft 12, the ends of this shaft being secured in any suitable manner against longitudinal movement out of the arms of the yoke. Formed in this shaft intermediate its ends is a circumferential groove 13 which forms one portion of a ball race. Disposed concentrically around the shaft 12 is a ring 14 to the opposite side faces of which are secured the flat rings 16. The central opening in each of the flat rings 16 is slightly smaller than the central opening of the ring 14 so as to provide a race for the ball bearings. Disposed between the shaft 12 and ring 14 and resting within the groove 13 and race of the rings 16 are the balls 17. At one side of the ring 14 is an apertured extension 18, for the reception of the hook 19 of the chain 20 which carries the swing 21.

In the movement of the swing, the ring 14 rocks on the balls 17, thus producing a free swinging movement, the balls also preventing any noise which usually occurs by the rubbing of the hook in the ordinary stationary ring or eye. The balls and race can be easily oiled, as they are exposed to view from the side of the device. Thus is produced a simple and efficient device which will be smooth and noiseless in its action, and which can be manufactured and sold at a comparatively low cost.

What is claimed is:

A device of the class described comprising a yoke, a shaft fixed between the arms thereof, said shaft having a peripheral groove formed centrally in its outer face, an oscillatable ring encircling the shaft over the groove, bearing balls disposed in the groove, and a pair of rings encircling the shaft on opposite sides of and secured to the ring to confine the balls within the groove and to prevent the ring moving toward the arms.

In testimony whereof, we affix our signatures, in the presence of two witnesses.

CHARLES I. NULL.
HERMAN P. RAAB.

Witnesses:
  JOHN K. MCLEARY,
  A. B. GOOLEY.